Sept. 4, 1962 J. P. SIMON 3,052,142
APPARATUS FOR SHEARING TUBULAR JACKETS
Filed Dec. 29, 1959 3 Sheets-Sheet 1
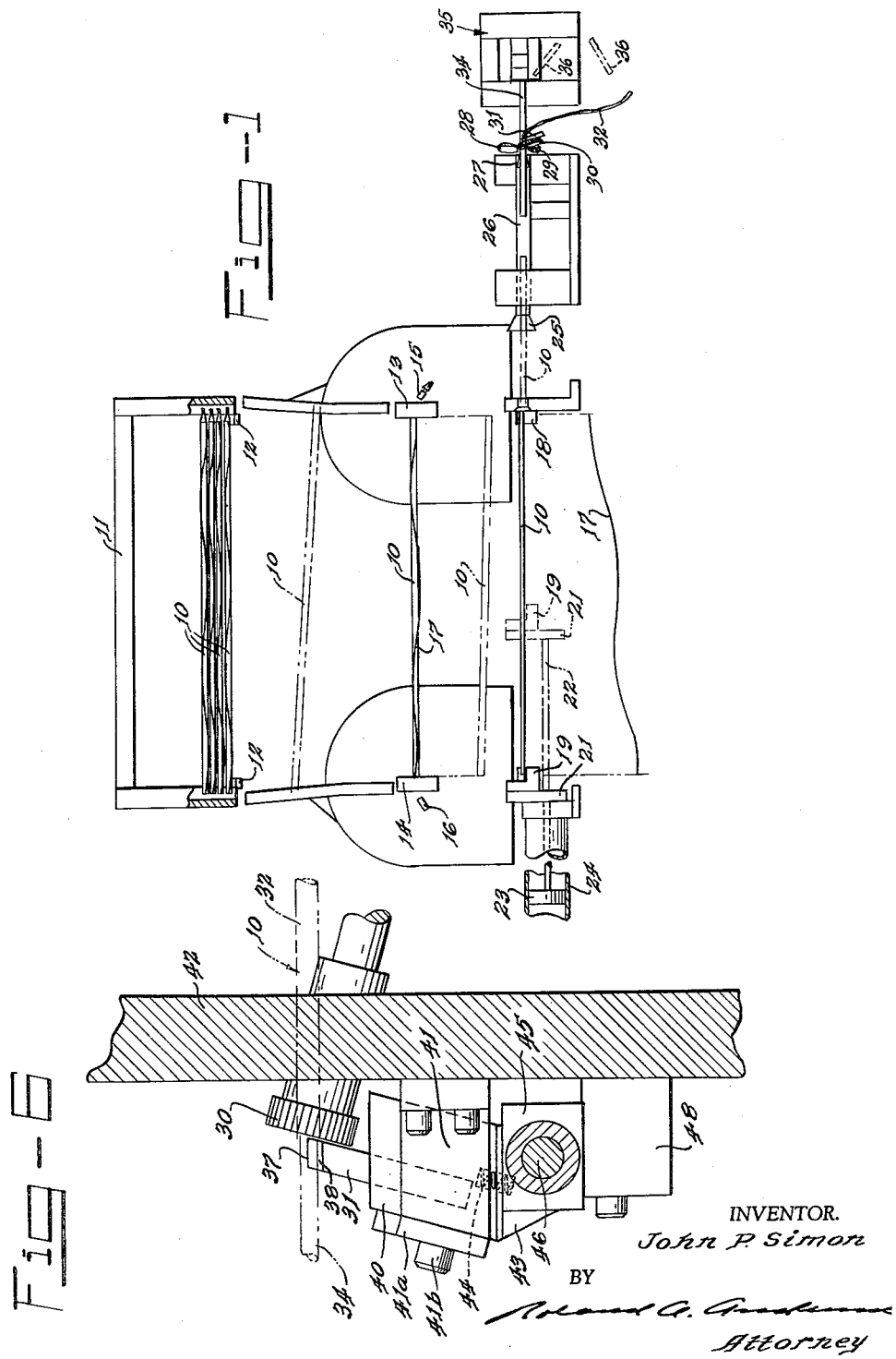
INVENTOR.
John P. Simon
BY
Attorney Sept. 4, 1962  J. P. SIMON  3,052,142
APPARATUS FOR SHEARING TUBULAR JACKETS
Filed Dec. 29, 1959  3 Sheets-Sheet 2
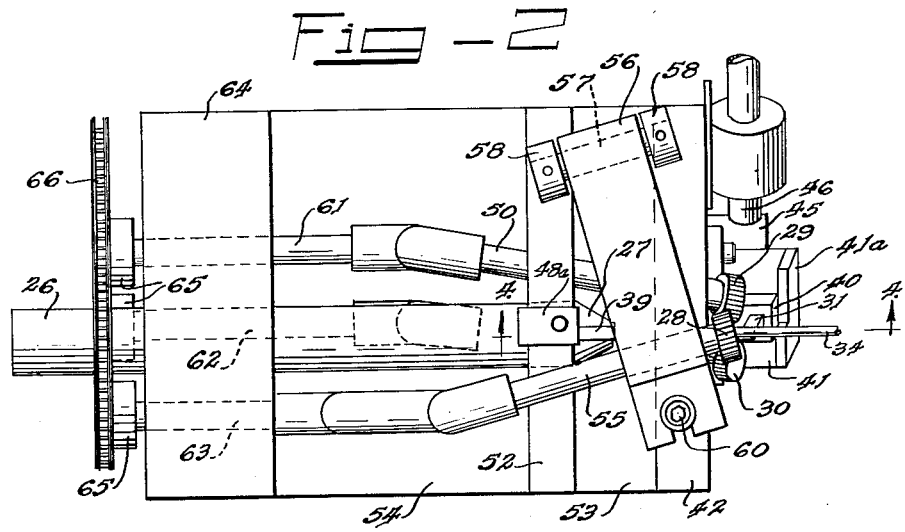
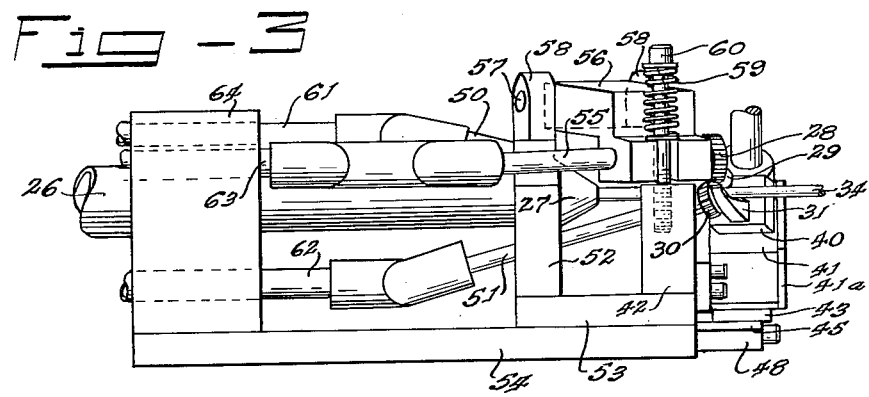
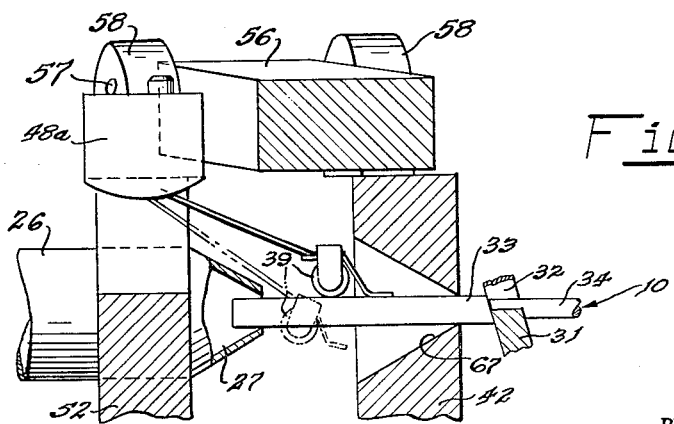
INVENTOR.
John P. Simon
BY
Roland A. Anderson
Attorney Sept. 4, 1962 J. P. SIMON 3,052,142
APPARATUS FOR SHEARING TUBULAR JACKETS
Filed Dec. 29, 1959 3 Sheets-Sheet 3
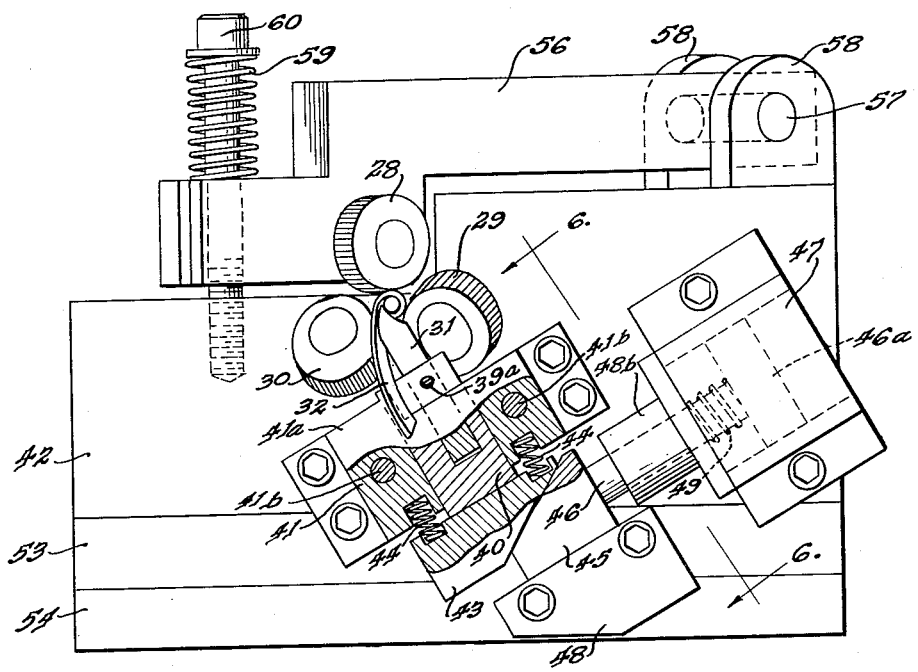
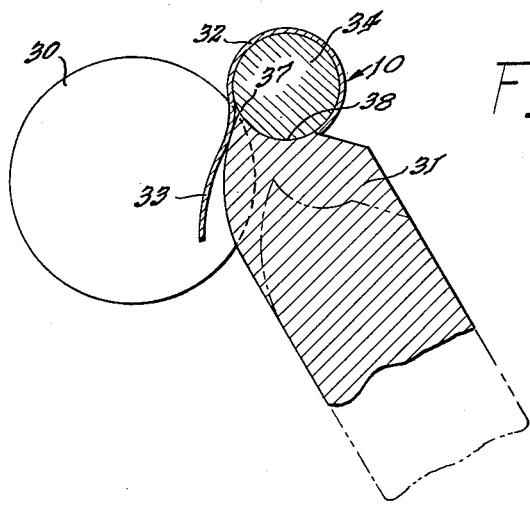
INVENTOR.
John P. Simon
BY
Attorney 3,052,142
APPARATUS FOR SHEARING TUBULAR JACKETS
John P. Simon, Glen Ellyn, Ill., assignor to the United
 States of America as represented by the United States
 Atomic Energy Commission
Filed Dec. 29, 1959, Ser. No. 862,734
3 Claims. (Cl. 82—54)

This invention relates to the removal of casings from objects. More specifically, it relates to an apparatus for removing a tubular jacket without damage to the contents of the jacket.

For some time spent fuel elements of nuclear reactors have been reprocessed for the production of new fuel elements. A big problem in such reprocessing is the separation and removal of the jacket of the fuel element from the core so that the reprocessing of the core may be carried out. Certain fuel elements to be reprocessed are of the pin or rod type comprising long thin cores of an alloy comprising zirconium, molybdenum, and principally uranium, tubular jackets of stainless steel, and sodium between the jackets and the cores.

Certain devices proposed or tried for removing tubular jackets from fuel-element cores have tended to damage or break the cores into pieces that are difficult to gather up and separate from the jackets. Other devices for this purpose cut the fuel-element jackets and thus produce small scrap jacket particles that are difficult to separate from the cores. Many of these devices use cutting lubricants or coolants, which adhere to the cores and complicate the task of reprocessing the cores.

The device of the present invention completely separates the fuel-element jacket and the core from one another as entire units without producing jacket or core fragments and without using lubricants or coolants.

In the drawings:

FIG. 1 is a diagrammatic view of the entire apparatus to which the shearing device of the present invention is applied;

FIG. 2 is a plan view of the novel shearing device;

FIG. 3 is an elevational view of the shearing device;

FIG. 4 is a sectional view taken on the line 4—4 of FIG. 2 and showing a switch responsive to the passage of a fuel element through the shearing device for releasing the sheared jacket from the device;

FIG. 5 is an end view, with parts broken away and in section, of the novel shearing device;

FIG. 6 is a sectional view taken on the line 6—6 of FIG. 5 and showing the mounting of a tool forming an essential element of the shearing device, feed rolls being omitted for the sake of clarity; and FIG. 7 is a diagrammatic sectional view showing the tool and a cooperating roll in relation to a fuel element from the tool and roll shearing the jacket.

As shown in FIG. 1, a plurality of fuel elements 10 are located in a hopper 11 and are released individually by a trigger mechanism 12. Each fuel element falls into shearing devices 13 and 14 which remove ends 15 and 16 of the fuel element 10 and the ends of a spiral spacing wire 17 welded to fuel-element ends 15 and 16. The wire 17, which extends along and about the fuel element 10 to space the same from other fuel elements 10 in the reactor, is now loose and becomes separated from the fuel element as they fall into slotted rests 18 and 19, the slots in the rests permitting the wire to fall free through the rests. The rest 18 is fixed, being attached to a fixed member 20 and the rest 19 is shiftable, being carried by a head 21 attached to a rod 22 connected to a piston 23 in a pneumatic cylinder 24.

The fuel element 10 is moved axially by the shiftable rest 19 through the fixed member 20 into a flared end 25 on a tube 26, through this tube, and out of a contracted end 27 thereon. If the spacing wire 17 has stayed on the fuel element 10, the wire will be stripped from the fuel element as it moves through the fixed member 20.

As the fuel element 10 emerges from the contracted end 27 of the tube 26, the fuel element moves into a space formed between feeding rolls 28, 29, and 30, which engage the fuel element and feed it axially. At the same time a tool 31 cooperates with the roll 30 in shearing a jacket 32 (FIG. 7) on the fuel element 10 into a spiral ribbon 33. A core 34 of the fuel element 10, now being stripped of the jacket 32, is fed into a chopper 35, which chops the core into short lengths 36.

As shown in FIGS. 2, 3, and 5, the feeding rolls 28, 29, and 30 have their axes extending at a small angle, for example, 15°, to the axis of the fuel element 10 so as to feed the fuel element while rotating it. The rolls 28, 29, and 30 are serrated to grip the fuel element better. The edge of the roll 30 adjacent the tool 31 is sharpened so that shearing of the jacket 32 into the ribbon 33 is facilitated.

As shown in FIGS. 3, 6, and 7, the tool 31 lies directly adjacent one face of the roll 30 with a very small clearance between the roll and the tool. As shown in FIG. 7, a tip 37 on the tool 31 lies closer to the axis of the fuel element 10 by an amount equal to the thickness of the jacket 32 of the fuel element; and an arcuate recess 38 formed on the tool 31 extends from the tip 37 so as to conform generally to the core 34 of the fuel element. The tool 31, which is stationary in operation, cuts the leading end of the jacket 32 as the fuel element 10 is fed by the rolls 28, 29, and 30 to the tool 31 to start the ribbon 33, and thereafter the tool 31 and the feeding roll 30, or more particularly the sharp edge on the adjacent face of the roll 30, cooperate to form the ribbon 33 by a shearing action performed along a spiral path on the jacket 32. In this way, the jacket is removed from the core 34 of the fuel element 10.

The leading end of the fuel element 10 arriving at the rollers 28, 29, and 30 and tool 31 has no end plug or closure, since the shearing device 13 has severed the end 15 just beyond the end of the core 34.

As shown in FIG. 4, a roller follower 39 rides the fuel element 10 just beyond the contracted end 27 of the tube 26. When the rear end of the fuel element 10 moves beyond the follower 39, it drops from the full-line position to the dotted-line position of FIG. 4 and thereby causes the tool 31 to drop from the full-line position of FIG. 7 to the broken-line position in which it is spaced from the fuel element 10. Thus the shearing of the fuel-element jacket 32 is stopped and the rear end of the fuel element 10, comprising an end plug (not shown) and the end of the jacket 32 attached to the end plug and still connected to the ribbon 33, is released from the feeding rolls 28, 29, and 30 by being fed out of them. By the time the tool 31 is shifted away from the fuel element 10, the shearing of the jacket 32 by the tool 31 and the roll 30 will have extended to about the end of the fuel core 34, so that no portion of the core is carried along with the ribbon 33.

As shown in FIG. 5, the tool 31 is attached by set screw 39a to a holder 40 which is slidably carried in a bed 41 and retained therein by a cover plate 41a secured to the bed by screws 41b. The bed 41 is attached to a mounting block 42. A wedge 43 is attached to the holder 40 and is yieldingly urged away from the bed 41 by coil springs 44 lodged in recesses in the block and wedge so that the tendency is to move the tool 31 away from the fuel element 10. The wedge 43 is engaged by a wedge 45 connected by a rod 46 to a piston 46a slidable in a pneumatic cylinder 47. The cylinder 47 is secured to the mounting block 42, which carries a support 48 along which the wedge slides.

When the fuel element 10 has been fed by the rolls 28, 29, and 30 beyond the follower 39 so that it drops to the broken-line position of FIG. 4, a switch 48a is actuated to open an electric circuit causing a valve (not shown) to stop the supplying of gas under pressure to the side of the piston 46a away from the rod 46. Thus the wedge 45 is shifted to the right as viewed in FIG. 5 into contact with a shoulder stop 48b on the cylinder 47, by a spring 49 in the cylinder 47 acting against the piston 46a, so that the wedge 43 and tool 31 can move downward, whereby the fuel element 10 is released. When a new fuel element 10 is moved by the shiftable rest 19 through the tube 26 far enough to lift the follower 39 to the full-line position of FIG. 4, the electric circuit controlling the supply of gas under pressure against the piston 46a is closed, and so the piston 46a and wedge 45 move leftward as viewed in FIG. 5, and the wedge 43 and the tool 31 are moved upward so that tool 31 is again in position to work with the feeding roll 30 in shearing the ribbon 33 from the fuel-element jacket 32.

The dropping of the follower 39 as the first fuel element moves beyond the follower will have caused the hopper 11 to release the new fuel element, to actuate the shearing devices 13 and 14 upon arrival of the new fuel element thereat, and to cause the movement of the shiftable rest 19 upon receiving the new fuel element, but the details for carrying out these operations are not shown, since they do not form, per se, a part of the present invention, which comprises, instead, the arrangement of feeding rolls 28, 29, and 30 and the tool 31.

As shown in FIGS. 2, 3, 5, and 6, the rolls 29 and 30 are attached to shafts 50 and 51 journaled in spaced mounting blocks 42 and 52, attached to a plate 53, in turn attached to a base 54. The roll 28 is attached to a shaft 55 journaled in a part 56, which is pivotally connected by a pin 57 and ears 58 to the mounting blocks 42 and 52 and restrained by a coil spring 59 and a screw 60. The spring 59 is retained between the part 56 and the head of the screw 60, which freely extends through the spring 59 and the part 56 into a threaded connection with the mounting block 42. The roll 28 is movable away from the rolls 29 and 30 against the action of the spring 59, so that the rolls 28, 29, and 30 accommodate fuel elements 10 of different diameter as well as bent fuel elements. The roll shafts 50, 51, and 55 are, of course, not parallel to one another, but are connected through universal joints to parallel drive shafts 61, 62, and 63, respectively, which are journaled in an upright 64 and carry sprockets 65 meshing with a sprocket chain 66 connected to a driving motor (not shown).

The tube 26, through which the fuel element 10 moves on its way to the feeding rolls 28, 29, and 30 and the tool 31, is mounted in the block 52 and the upright 64. The block 42, which is only a short distance from the contracted end 27 of the tube 26, has a tapered opening 67 which is aligned with the tube 26 and has its small end just a little larger than the fuel element 10 so as to guide it between the feeding rolls 28, 29, and 30.

The rolls 28, 29, and 30 and the tool 31 may be formed of oil-quenched tool steel. The fuel-element jacket 32 may be a #304 hard drawn stainless steel tube having a wall thickness of 0.009" and an outer diameter of .174".

The fuel-element core 34 may be of an alloy composed, before irradiation, of 92 w/o highly enriched uranium, 0.10 w/o zirconium, 3.4 w/o molybdenum, and some other elements, and have a length of 14" and a diameter of 0.144". There may be a thermal-bond layer of sodium between the core 34 and the jacket 32. In the reactor the jacket and core may have become mechanically bonded or welded to one another at certain regions. The fuel element 10 processed by the rolls 28, 29, and 30 and tool 31 has been described as sheared of its ends 15 and 16 so that it has no end plug or closure at the leading end of the core 34, but does have an end plug or closure at the trailing end. It will be understood that the rolls 28, 29, and 30 and tool 31 might also shear the jacket from a fuel element having an end plug at neither end. Moreover, the rolls 28, 29, and 30 and tool 31 are also capable of shearing a tube into a ribbon, even though there is no core in the tube. In any event, it is important that the tool 31 be withdrawn to the broken-line position of FIG. 7 while a portion of the rear end of the jacket 32 (or tube) remains in the rolls 28, 29, and 30, for if the rear end of the jacket is fed out of the rolls while the tool 31 is in shearing position, the rear end of the jacket may become caught on the tool. Furthermore, cutting the region of the tube or jacket 32 where the end plug is located might dislodge the end plug and cause it in some way to become mixed with the short lengths 36 of the core 34.

The intention is to limit the claims only within the scope of the appended claims.

What is claimed is:

1. A device for removing a tubular jacket from a core lying therein, said device comprising a plurality of feeding rolls surrounding the tubular jacket so as to feed the same axially, and a tool lying directly adjacent and cooperating with an end face of one of the feeding rolls so as to shear the tubular jacket into a spiral strip.

2. A device for cutting a tube into a spiral strip, comprising three rolls spaced about the tube for feeding the same axially, the axes of the rolls being at a small angle to the axis of the tube, and a stationary tool lying directly adjacent and cooperating with an end face of one of the rolls for shearing the tube against the said one roll.

3. A device for removing a tubular jacket from the core of a nuclear-fuel element, said device comprising three serrated feeding rolls spaced about the jacket for feeding the jacket and element axially, the axes of the rolls being at a small angle to the axis of the jacket, one roll having a sharp edge at one end, and a stationary tool lying directly adjacent the said one end of the one roll and having a tip somewhat closer to the axis of the jacket than the sharp edge of the one roll and an arcuate portion extending from the tip and generally conforming to the core of the fuel element, whereby said tool cooperates with the sharp edge of the one roll to shear the tubular jacket into a strip.

References Cited in the file of this patent

UNITED STATES PATENTS

| | | |
|---|---|---|
| 1,643,157 | Gardner | Sept. 20, 1927 |
| 1,756,171 | Boomer | Apr. 29, 1930 |
| 2,323,700 | Bailey | July 6, 1943 |